United States Patent [19]

Mousseaux et al.

[11] Patent Number: 5,101,464
[45] Date of Patent: Mar. 31, 1992

[54] DEVICE PROVIDING TWO OPTICAL COUPLINGS, IN PARTICULAR FOR AN OPTICAL FIBER TRANSMISSION SYSTEM

[75] Inventors: Daniel Mousseaux, Palaiseau; Bruno Chevet, Les Ulis; Michel Monnot, Orsay; Emmanuel Grard, Saint Michel sur-Orge, all of France

[73] Assignee: Alcatel CIT, Paris, France

[21] Appl. No.: 607,187

[22] Filed: Oct. 31, 1990

[30] Foreign Application Priority Data

Nov. 30, 1989 [FR] France .................. 89 15804

[51] Int. Cl.$^5$ .............................................. G02B 6/36
[52] U.S. Cl. ........................ 385/88; 385/91; 385/92
[58] Field of Search .......... 350/96.2, 96.21, 96.15; 357/74; 385/88, 94

[56] References Cited

U.S. PATENT DOCUMENTS 4,079,927 3/1978 Rocton .................... 269/296
4,714,315 12/1987 Krause .................... 350/96.2
4,756,592 7/1988 Sasayama et al. ........ 350/96.2

FOREIGN PATENT DOCUMENTS 0104882 4/1984 European Pat. Off.
0133394 2/1985 European Pat. Off.
0326993 8/1989 European Pat. Off.

Primary Examiner—Frank Gonzalez
Assistant Examiner—John Ngo
Attorney, Agent, or Firm—Sughrue, Mion, Zinn, Macpeak & Seas

[57] ABSTRACT

An opto-electronic component such as a semiconductor optical amplifier (L) is mounted on a copper base (EL) which is received in a receptacle constituted by two blocks (DA, DB) of ferrous alloy. Two other blocks (BA, BB) carry fibers to be coupled (FA, FB) and they are fixed to said receptacle by weld spots (PA, QA, PB, QB) on the edges of the faces of said blocks that are bearing against one another. The invention is particularly suitable for optical fiber telecommunications networks.

13 Claims, 4 Drawing Sheets

DEVICE PROVIDING TWO OPTICAL COUPLINGS, IN PARTICULAR FOR AN OPTICAL FIBER TRANSMISSION SYSTEM

The present invention relates to a device providing two optical couplings between a component and small section light waveguides as are to be found in an optical fiber transmission system. A prior art device of this nature is described initially. For this purpose, it is assumed that such a device extends from a rear end to a front end along a longitudinal direction (Z) and that the device also defines transverse directions comprising a lateral direction (X) and a vertical direction (Y) relative thereto. This device includes the following items which it shares in common, with respect to their functions mentioned below, with a particular embodiment of a device of the present invention:

a rear waveguide constituted by a length of longitudinal light waveguide having an inner end towards the front for performing rear optical coupling;

a rear waveguide support disposed beneath said rear waveguide and carrying said waveguide close to its said inner end;

an opto-electronic component having a rear coupling surface for performing said rear optical coupling, and a front coupling surface for front optical coupling;

electrical conductors for supplying electrical power to said opto-electronic component;

a component base having a top face supporting said opto-electronic component, said base being constituted by a base material which is thermally conductive to enable heat produced in said component to be removed;

thermal action means which are typically cooling means of providing thermal regulation, and which are in thermal contact with said component base for regulating the temperature of said component;

a front waveguide constituted by a length of longitudinal light waveguide having an inner end towards the rear for performing said front optical coupling;

a front waveguide support disposed beneath said front waveguide and carrying said waveguide close to its said inner end; and holding means for holding said rear and front waveguide supports relative to said component base to hold said rear and front optical couplings.

The role performed by such a device is typically amplification: a signal greatly attenuated by long distance guided travel is received by a fiber constituting the rear waveguide, and the signal is restored with greatly increased power in another fiber constituting the front waveguide. The said opto-electronic component is then typically a semiconductor light amplifier constituted by a laser diode.

A fiber is typically optically coupled to such a component by means of a lens formed on the end of the fiber. This requires firstly that said end is accurately positioned relative to the component, and then that the fiber is fixed relative to the base which carries the component. Such optical coupling is paticularly difficult to achieve when light is to be injected into a monomode fiber since the real position of the fiber must then be within a few hundredths of its optimum position, at least in transverse directions. If the fiber is offset by more than that, then coupling efficiency is not acceptable. An offset of 100 nm, for example, may cause coupling losses to go from 0 dB to 1 dB.

A particular object of the present invention is to make it possible to provide a device providing two optical couplings in such a manner that both optical couplings are provided with a level of loss which is low and which remains low in the long term.

To this end, the present invention provides a device for providing two optical couplings, the device comprising a thermally conductive component base for carrying an opto-electronic component whose temperature is to be regulated, said device further including two waveguide supports for carrying two longitudinal light waveguides on either side of the component and for coupling said component to said two wave-guides, the device being characterized by the fact that said component base is fixed in thermal contact in a receptacle which is constituted by a material different from that of said base and which has two transverse bearing faces in contact with two transverse bearing faces of said two waveguide supports for facilitating adjustment of the transverse positions of said supports relative to said receptacle prior to fixing them thereto.

More particularly, the device of the invention includes at least some of the above-mentioned common items and, compared with the above-mentioned prior art device, it is characterized by the fact that said holding means comprise a central receptacle which forms a recess receiving said component parts, said receptacle comprising:

an inner rear assembly block situated behind said recess, a plane transverse rear face of said block constituting an inner rear bearing face;

an inner front assembly block situated in front of said recess, a plane transverse front face of said block constituting an inner front bearing face and said block being fixed to said inner rear assembly block; and base holding means for pressing a contact surface of said component base against a contact surface of at least one receiver block which is one of said rear and front inner assembly blocks, thereby fixing said base relative to said receptacle and, at least in some cases, making thermal contact between said base and said receiver block;

said thermal action means being disposed in such cases in indirect thermal connection with said component base via said receiver block;

said rear waveguide support being an outer rear assembly block having a plane transverse front face which constitutes an outer rear bearing face bearing against said inner rear bearing face;

said front waveguide support being an outer front assembly block having a plane transverse rear face which constitutes an outer front bearing face bearing against said inner front bearing face;

all four said assembly blocks being made of rigid and weldable assembly materials;

rear weld sports being made at the edge of at least one of said two rear bearing faces to weld said outer rear assembly block to said inner assembly block; and front weld spots being made at the edge of at least one of said two front bearing faces to weld said inner front assembly block to said outer front assembly block.

An implementation of the present invention is described below with reference to the accompanying diagrammatic figures, it being understood that the items and dispositions mentioned and described are given purely by way of non-limiting example. When the same item appears in more than one of the figures it is designated in all of them by the same reference symbol.

In these figures, the said longitudinal, lateral and vertical directions are referenced Z, X, and Y respectively.

The waveguides are rear and front fibers reference FA and FB. These fibers are surrounded in the vicinity of said assembly blocks (except at their inner ends FAT and FBT) by two respective fiber-carrying metal tubes TA and TB in which they are fixed. Their ends have been softened by heating to form curved refracting surfaces which improve optical coupling.

Figure 1:
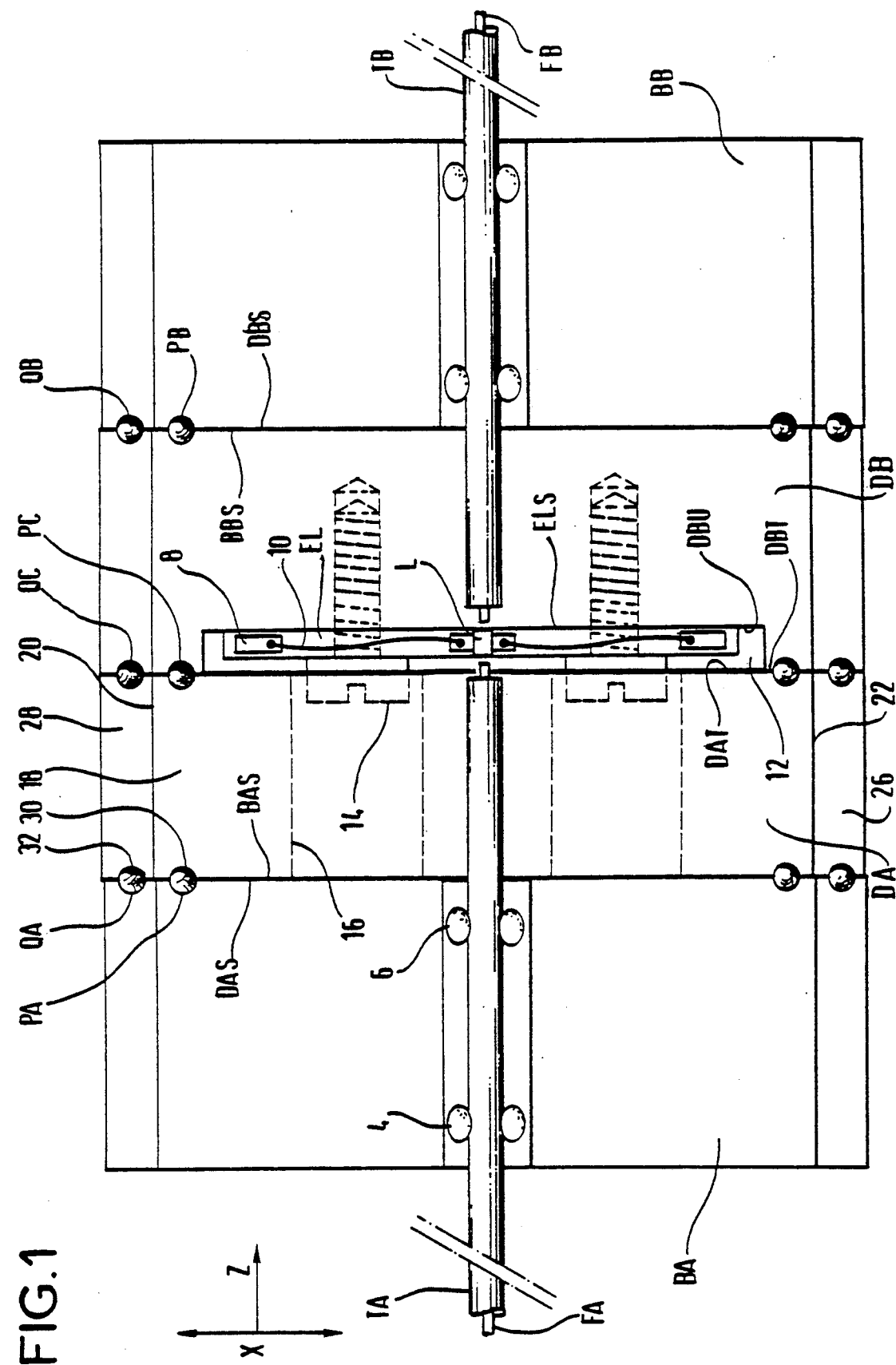
FIG. 1 is a plan view of a functional assembly of a device in accordance with the present invention.
Figure 4:
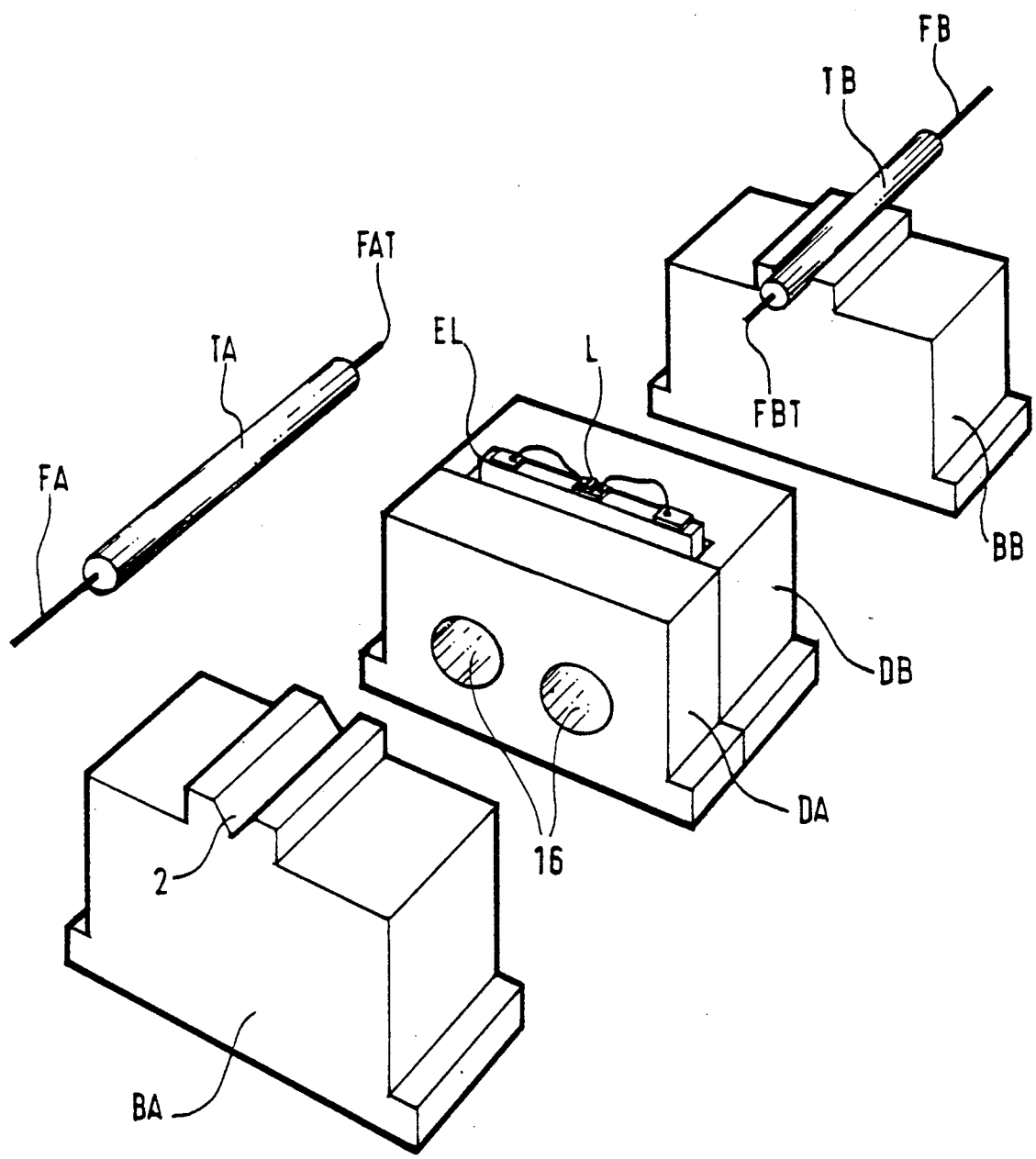
FIG. 4 is a perspective view of the functional assembly of FIG. 1 while being assembled.
Figure 5:
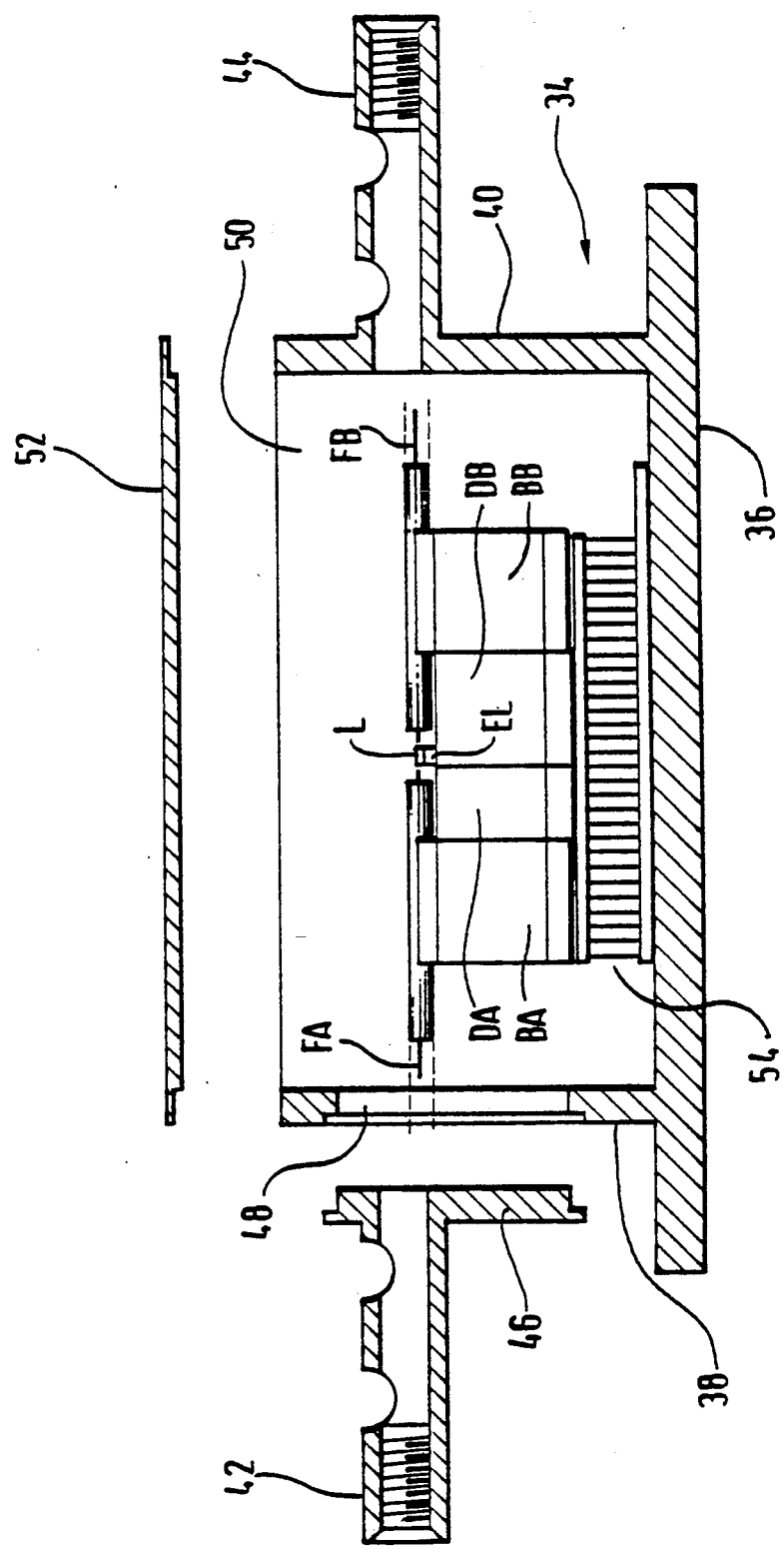
FIG. 5 is a side view of the same device showing a housing for said device in axial section after said functional assembly has been assembled and prior to fixing a cover and an add-on plate to the housing.

Each of the tubes TA and TB is disposed in a corresponding V-groove such as 2 (FIG. 4) which is formed in an outer rear assembly block BA or an outer front assembly block BB. Each tube is fixed to the corresponding block by four fiber-fixing weld spots such as 4 and 6 (FIG. 1).

Figure 2:
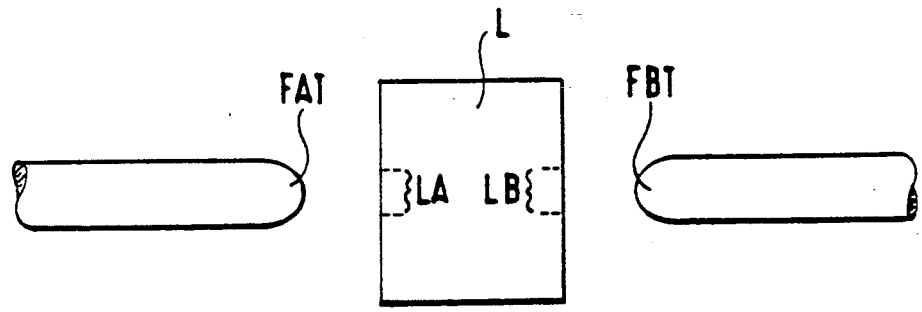
FIG. 2 shows a detail of FIG. 1 on a larger scale.
Figure 3:
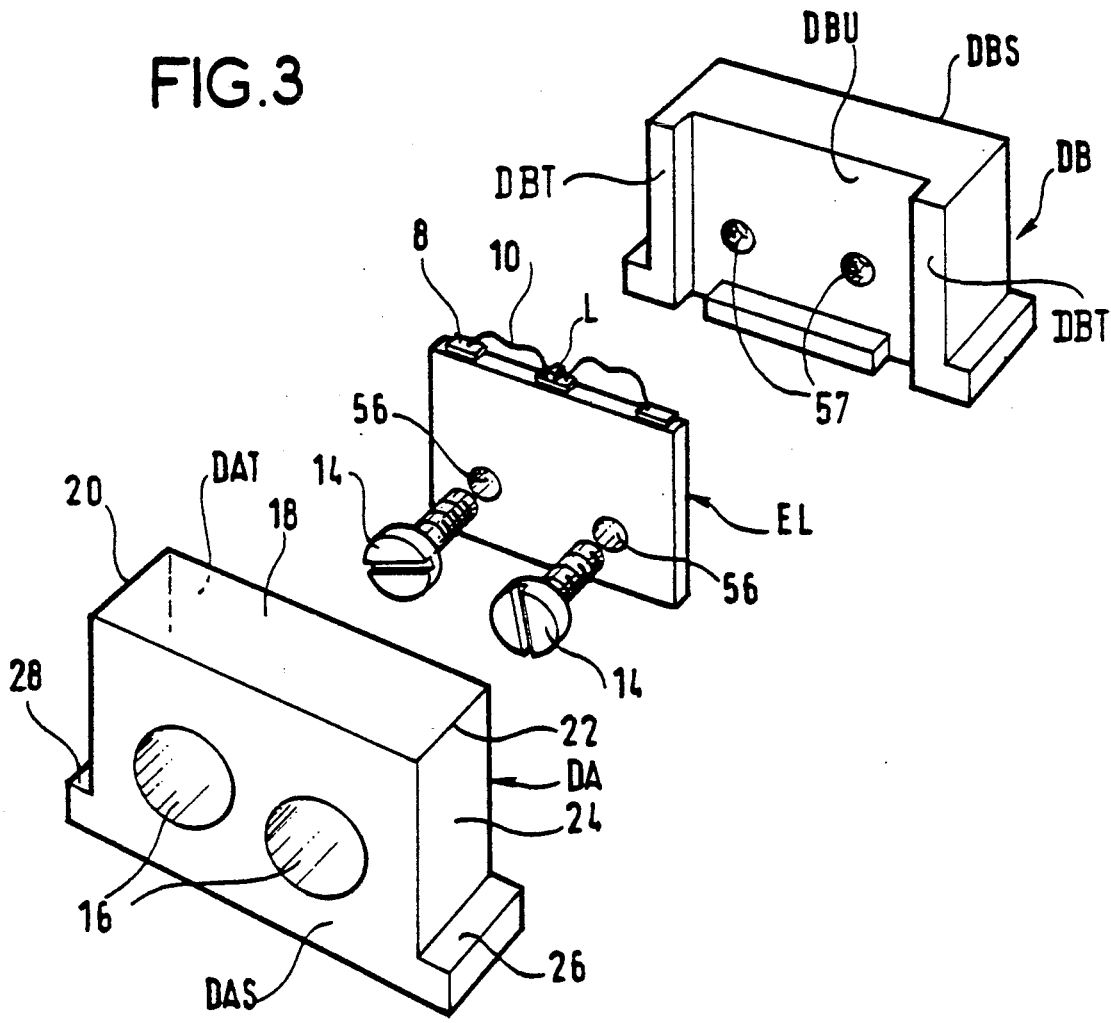
FIG. 3 is a perspective view of a central receptacle of said device prior to assembly.

Said component is a semiconductor light amplifier constituted by a laser diode L having said rear coupling surface LA and front coupling surface LB (see FIG. 2) facing said inner ends FAT and FBT. The component is mounted on a component base EL and it is powered electrically by fine gauge electrically conductive wires such as 10 connected to connection tabs such as 8 formed on the same base.

The base is made of a metal which is a good conductor of heat and which facilitates the fixing of the optoelectronic component and of items associated therewith, with such a metal typically being constituted by copper. It is in the form of a plate whose thickness extends in said longitudinal direction Z and is substantially equal to the length of said opto-electronic component L, i.e. to the distance between the coupling surfaces thereof, which distance also extends along said direction Z. This disposition has the advantage of facilitating a treatment operation which is performed on the rear and front coupling surfaces of the component after the component has already been fixed on the base. This treatment is typically an antireflection multilayer optical treatment.

In order to receive the base EL, a recess 12 is formed in a central receptacle which is constituted by rear and front inner assembly blocks DA and DB.

Although the receptacle is constituted in the device shown by way of example by two distinct parts forming blocks DA and DB, it should be understood that such a receptacle could also be formed as a single part by hollowing out such a part by electro-erosion. When a single part is used, two portions of said single part are situated behind and in front of the recess and correspond to said rear and front inner assembly blocks.

One of the main faces of the base EL constitutes a contact surface ELS which is plane and extends transversely, and which is pressed against a corresponding contact surface DBU of the inner front block DB, which block then constitutes said receiver block.

This is done by at least one, and preferably two, screws such as 14 which screw longitudinally into corresponding tapped holes 57 in the receiver block. Prior to the blocks BA and DA being assembled together, the heads of these screws are accessible via longitudinal bores such as 16 formed through the block DA.

The assembly blocks BA, DA, DB, and BB are solid parts made of the same metal having a low coefficient of thermal expansion, a high melting temperature, a relatively high degree of hardness, and low deformability. This assembly metal may be an Fe, Ni, Co alloy, for example. By selecting such a material, objectionable deformation which could arise during changes in temperature and/or in the course of time is avoided, and in particular deformation which could occur when forming the weld spots that fix these blocks together. The choice of material also makes it possible to provide contact faces which are plane and polished and which are capable of sliding over one another closely during transverse position-adjusting operations.

At the date of the present invention, the details given above concerning the available materials for the base and for the assembly suffer from the drawback that it appears in practice that the coefficient of thermal expansion of the assembly material has to be less than that of the base material, and in the event of variations in operating temperature, this gives rise to differential expansion. However, in the context of the present invention, it presently appears preferable to accept this drawback while reducing its magnitude by appropriate temperature regulation.

Each of these blocks, such as block DA, comprises:

a top face 18 formed between two lateral edges 20 and 22 each of which extends along the longitudinal direction Z, which edges are at a distance apart from each other along the lateral direction X;

two lateral faces 24 which extend downwards along the relative vertical direction Y from respective ones of said two lateral edges; and two shoulders 26 and 28 projecting from said lateral faces along said transverse direction X and at a distance from respective ones of said lateral edges.

Two of the welds spots such as PA which weld the block extend over a small portion such as 30 of the top face 18 in the vicinity of respective ones of the two side edges 20 and 22. Two other weld spots such as QA extend over respective small portions such as 32 of respective ones of the two shoulders 26 and 28. These weld spots can thus be made by pulses from a beam of radiated energy which always propagates substantially along said relative vertical direction. Such radiation may be provided, for example, by a YAG type laser.

The weld spots formed in this way are autogenous weld spots, i.e. they are constituted by said assembly metal which has melted locally under the impact of said radiated energy.

These weld sports are, in particular, rear weld spots such as PA and QA formed respectively on the top faces such as 18 and on the shoulders such as 28 for welding together the rear blocks BA and DA, and front weld spots such as PB and QB for welding together the front blocks BB and DB. Said bearing surfaces such as DAS and BAS or DBS and BBS which bear mutually against one another are substantially the same shape as one another, they have substantially the same dimensions, and they coincide substantially, and the weld spots such as PA and QA or PB and QB which interconnect pairs of blocks having such faces extend over two adjacent edges belonging to respective ones of said faces.

Said recess receiving said component base EL is formed in at least one of said rear and front inner assembly blocks DA and DB, and in this case in DB.

These two blocks have respective transverse plane middle bearing faces DAT and DBT bearing against each other. Middle weld spots PC and QC are formed on the edges of at least one of these two middle bearing faces and preferably on their common edge in order to weld the rear inner assembly block DA to the front inner assembly block DB.

The device is implemented in a housing comprising:

a bottom 36 which carries, at least indirectly, a functional assembly comprising said assembly blocks BA, DA, DB, and BB; and two end walls, one end wall 38 at the rear end and another rear wall 40 at the front end of the device. Each of these end walls is provided with a fixing tail 42 or 44 extending longitudinally outwards for fixing and carrying a respective one of the rear and front fibers at a distance from their said inner ends. At least one of these end walls, in this case the wall 38, is a composite wall including an add-on panel 46 which is provided with said tail and which closes an opening 48 through the said wall, such that said functional assembly carrying the rear and front fibers can be inserted into the housing through said opening while the device is being made.

The housing also has two side walls 50 and an add-on cover 52.

The bottom 36 carries a Peltier effect temperature regulator member 54 in the form of a horizontal plate. This member constitutes cooling means, or more generally thermal action means. The central hollow DA, DB is fixed with good thermal contact on said member.

The device described above is made by a method which constitutes part of the subject matter of the present invention, and which comprises the following main stages:

said two rear bearing faces BAS and DAS and said two front bearing faces DBS and BBS are caused to bear against each other in pairs;

said rear fiber FA, said base EL carrying the opto-electronic component L, and said front fiber FB are fixed respectively to said outer rear assembly block BA, to said central recess DA, DB, and to said outer front assembly block BB, after adjusting the longitudinal positions of the fibers relative to said component;

the relative transverse positions of said rear fiber FA, of said opto-electronic component L, and of said front fiber FB are adjusted with mutual friction between said bearing faces that are bearing against one another, thereby providing said inlet and outlet optical couplings; and said rear weld spots PA, QA and said front weld spots (PB, QB) are made by localized melting of said assembly materials under the impact of short pulses of radiated energy.

The stages of adjusting the positions and of subsequently making the rear and front weld spots are preferably performed in accordance with the alignment method described in French patent application No. 2 627 868.

In greater detail, the first assembly operations consist in fixing the component L and the wires 10 together with all the other parts that may be required on the base EL which is pierced by two holes 56 for passing the shanks of two screws such as 14.

Then the base is fixed to the block DB using said screws which engage in the two tapped holes 57 in said block. This block is also fixed to the block DA by weld spots such as PC and QC. Thereafter the longitudinal positions of the fibers FA and FB relative to the blocks BA and BB are adjusted by sliding tubes TA and TB in the grooves such as 2 and simultaneously preliminary adjustment of their transverse positions is performed by displacing these blocks transversely. To do this, the blocks are pressed via said rear and front bearing faces against the receptacle as constituted by the blocks DA and DB. These adjustments are guided by measuring optical coupling. Thereafter these fibers are fixed to the blocks by weld spots such as 4 and 6.

The final transverse positions are then adjusted, still using optical coupling measurements, and the rear and front weld spots are made using the above-mentioned alignment procedure.

These adjustments and fixing operations are performed initially at one end of the device, e.g. on the rear end, and then at the other end, e.g. the front end.

Further, the temperature regulation member 54 is fixed to the bottom of the housing 36. The functional assembly constituted by the blocks BA, DA, DB, and BB and which carries the fibers Fa and FB together with the diode L mounted on its base EL is inserted into the housing via the opening 48, with the front fiber FB being inserted into the tail 44. The assembly is fixed on the member 54 and the front fiber is fixed in its tail, after which the panel 46 is put into place with the rear fiber FA being inserted in the tail 42.

This panel and the corresponding fiber are then fixed, and after the electrical connections have been made, so is the cover 42.

A compact device which provides the two couplings required in a manner which is both reliable and efficient is thus easily made easily while still enabling the opto-electronic component that is to be coupled to operate under substantially optimum conditions, in particular optimum thermal conditions.

We claim:

1. A device for providing two optical couplings, in particular in an optical fiber transmission system, said device comprising a thermally conductive component base (EL) for carrying an opto-electronic component (L) whose temperature is to be regulated, said device further including two waveguide supports (BA, BB) for carrying two longitudinal light waveguides (FA, FB) on either side of the component and for coupling said component to said two waveguides, the improvement comprising said component base (EL) being fixed in thermal contact in a receptacle (DA, DB) which is constituted by a material different from that of said base and which has two transverse bearing faces (DAS, DBS) in contact with two transverse bearing faces (BAS, BBS) of said two waveguide supports (BA, BB) for facilitating adjustment of the transverse positions of said supports relative to said receptacle prior to fixing them thereto, and said device extending from a rear end to a front end along a longitudinal direction (Z) and also defining transverse directions relative to said device, said directions comprising a lateral direction (X) and a vertical direction (Y), and said device further comprising:

a rear waveguide (FA) constituted by a length of longitudinal light waveguide having an inner end (FAT) towards the front for performing rear optical coupling;

a rear waveguide support disposed beneath said rear waveguide and carrying said waveguide close to its said inner end;

an opto-electronic component (L) having a rear coupling surface (LA) for performing said rear optical coupling, and a front coupling surface (LB) for front optical coupling;

a component base (EL) having top face supporting said opto-electronic component;

a front waveguide (FB) constituted by a length of longitudinal light waveguide having an inner end (FBT) towards the rear for performing said front optical coupling;

a front waveguide support disposed beneath said front waveguide and carrying said waveguide close to its said inner end; and holding means for holding said rear and front waveguide supports relative to said component base to hold said rear and front optical couplings;

said holding means comprise a central receptacle which forms a recess (12) receiving said component parts, said receptacle comprising:

an inner rear assembly block (DA) situated behind said recess, a plane transverse rear face of said block constituting an inner rear bearing face (DAS);

an inner front assembly block (DB) situated in front of said recess, a plane transverse front face of said block constituting an inner front bearing face (DBS) and said block being fixed to said inner rear assembly block; and base holding means (14) for pressing a contact surface (ELS) of said component base against a contact surface (DBU) of at least one receiver block (DB) which is one of said rear and front inner assembly blocks, thereby fixing said base relative to said receptacle;

said rear waveguide support being an outer rear assembly block (BA) having a plane transverse front face which constitutes on outer rear bearing face (BAS) bearing against said inner rear bearing face;

said front waveguide support being an outer front assembly block (BB) having a plane transverse rear face which constitutes an outer front bearing face (BBS) bearing against said inner front bearing face;

all four said assembly blocks being made of rigid and weldable assembly materials;

rear weld spots (PA, QA) being made at the edge of at least one of said two rear bearing faces to weld said outer rear assembly block to said inner assembly block; and front weld spots being made at the edge of at least one of said two front bearing faces to weld said inner front assembly block to said outer front assembly block.

2. A device according to claim 1, characterized by the fact that said component base (EL) is constituted by a thermally conductive base material;

said device further including thermal action means (54) in thermal connection with said component base (EL) to remove heat produced in said component and/or to regulate its temperature;

said base holding means (14) ensuring thermal contact between said component base and said receiver block (DB); and said thermal action means (54) being disposed in indirect thermal connection with said component base via said receiver block.

3. A device according to claim 2, characterized by the fact that said base material is a better conductor of heat than said assembly material.

4. A device according to claim 1, characterized by the fact that the size of said component base (EL) in said longitudinal direction (Z) is substantially equal to the size of said opto-electronic component (L) in said direction.

5. A device according to claim 1, characterized by the fact that said bearing faces that bear against one another (DAS, BAS) are of substantially the same shapes and sizes, and are in coincidence, each of said weld spots (PA) interconnecting two of said assembly blocks (BA, DA) having two such faces extending over two adjacent edges belonging to respective ones of said two faces.

6. A device according to claim 1, characterized by the fact that said weld spots (PA, QA, PB, QB) are autogeneous weld spots constituted by said assembly materials.

7. A device according to claim 6, characterized by the fact that each of said assembly blocks (DA) substantially comprises:

a top face (18) formed between two lateral edges (20, 22) each of which extends along said longitudinal direction (Z) and which are spaced apart from each other along said lateral direction (X);

two lateral faces (24) which extend downwards along said relative vertical direction (Y) from respective ones of said two lateral edges; and two shoulders (26, 28) projecting from respective ones of said two lateral faces along said transverse direction (X) and at a distance from said two lateral edges;

two of said weld spots welding said block extending over a small portion (30) of said top face in the vicinity of respective ones of said two lateral edges (20); and two of said weld spots welding said block extending over small portions (32) of respective ones of said two shoulders in such a manner that said weld spots are suitable for being made by pulses of a beam of energetic radiation which always propagates substantially along said relative vertical direction.

8. A device according to claim 1, characterized by the fact that said recess (12) receiving said component base (EL) is formed in at least one (DB) of said two inner assembly blocks (DA, DB), these two blocks being constituted by two separate parts each having two transverse plane middle bearing faces (DAT, DBT) bearing against one another in pairs, middle weld spots (PC, QC) being formed in an edge of at least one of said pairs of middle bearing faces to weld said inner front assembly block to said inner rear assembly block.

9. A device according to claim 1, characterized by the fact that said holding means for holding said component base include at least one screw (14) screwed into said receive block (DB).

10. A device according to claim 1, characterized by the fact that it includes a housing (34) having:

a bottom (36) which carries, at least indirectly, a functional assembly comprising said assembly blocks (BA, DA, DB, BB);

two end walls, one of the end walls (38) being at a front end and the other of the end walls (40) being at a rear end of said device, each of said end wall being provided with a fixing tail (42, 44) extending longitudinally outwards for fixing and carrying one of said rear and front waveguides (FA, FB) at a distance from the said inner end thereof (FAT, FBT), at least one of said end walls being a composite wall (38) comprising an add-on panel (46) provided with said tail (42) and closing an opening (48) through said wall;

two lateral walls (50); and an add-on cover (52), such that said functional assembly carrying said rear and front waveguides is capable of being inserted into said housing when the device is being made via said opening through said composite wall.

11. A method of making a device according to claim 1, characterized by the fact that it comprises the following steps:

causing said two rear bearing faces (BAS, DAS) to bear against each other and causing said two front bearing faces (DBS, BBS) to bear against each other;

fixing said rear waveguide (FA), said base (EL) carrying said opto-electronic component (L) and said front waveguide (FB) respectively relative to said outer rear assembly block (BA), said central receptacle (DA, DB), and said outer front assembly block, after adjusting the relative longitudinal positions thereof;

adjusting the relative transverse positions of said rear waveguide (FA), of said opto-electronic component (L) and of said front waveguide (FB) with mutual friction between said bearing faces that are bearing against one another, thereby achieving said inlet and outlet optical couplings; and making said rear (PA, QA) and front (PB, QB) weld spots by localized melting of said assembly materials under the impact of short pulses of radiated energy.

12. A method according to claim 11, for making a device according to claim 9, characterized by the fact that said middle weld spots (PC, QC) are made before said stage of adjusting the transverse positions.

13. A device for providing two optical couplings, said device comprising a thermally conductive component base (EL) for carrying an opto-electronic component (L) whose temperature is to be regulated, said component base (EL) being fixed by a main transverse face thereof in thermal contact in a receptacle (DA, DB) which is constituted by a material different front that of said component base and which has two transverse bearing faces (DAS, DBS), said device further including two waveguide supports (BA, BB) for carrying two longitudinal light waveguides (FA, FB) to be coupled to said opto-electronic component on either side thereof, said two waveguide supports having two transverse bearing faces in respective contact with said two transverse bearing faces (BAS, BBS) of said receptacle.

* * * * *